(12) United States Patent
Passi

(10) Patent No.: US 10,965,819 B2
(45) Date of Patent: Mar. 30, 2021

(54) TELECOM INFORMATION PROCESSING SYSTEM AND METHOD THEREOF

(71) Applicant: Hemant Passi, South Turramurra (AU)

(72) Inventor: Hemant Passi, South Turramurra (AU)

(*) Notice: Subject to any disclaimer, the term of this patent is extended or adjusted under 35 U.S.C. 154(b) by 0 days.

(21) Appl. No.: 16/659,556

(22) PCT Filed: Apr. 23, 2018

(86) PCT No.: PCT/AU2018/050370
§ 371 (c)(1),
(2) Date: Oct. 21, 2019

(87) PCT Pub. No.: WO2018/191796
PCT Pub. Date: Oct. 25, 2018

(65) Prior Publication Data
US 2020/0296220 A1    Sep. 17, 2020

(30) Foreign Application Priority Data
Apr. 21, 2017  (AU) .............................. 2017901455

(51) Int. Cl.
*H04M 15/00* (2006.01)
*G06Q 30/04* (2012.01)

(52) U.S. Cl.
CPC ............ *H04M 15/41* (2013.01); *G06Q 30/04* (2013.01); *H04M 15/44* (2013.01); *H04M 15/58* (2013.01); *H04M 15/70* (2013.01)

(58) Field of Classification Search
CPC ...... H04M 15/41; H04M 15/44; H04M 15/58; H04M 15/70; G06Q 30/04; G06Q 30/02; G06Q 30/0251; G06Q 40/12; H04L 12/1428; H04L 12/1432; H04L 12/1435; H04L 12/1457; H04L 12/1482; H04W 4/24; H04W 76/10
USPC .................. 379/114.02; 455/406, 405, 550.1
See application file for complete search history.

(56) References Cited

U.S. PATENT DOCUMENTS

| | | | | |
|---|---|---|---|---|
| 6,493,679 B1 * | 12/2002 | Rappaport | ............. | G06Q 30/04 705/1.1 |
| 7,986,935 B1 * | 7/2011 | D'Souza | ................ | G06Q 30/02 379/114.02 |
| 8,219,062 B2 * | 7/2012 | Bandera | .............. | H04M 15/846 455/405 |

(Continued)

OTHER PUBLICATIONS

International Application No. PCT/AU2018/050370, International Search Report, dated Aug. 9, 2018.

*Primary Examiner* — Nathan S Taylor
(74) *Attorney, Agent, or Firm* — Kunzler Bean & Adamson, PC

(57) ABSTRACT

The disclosed telecom information processing system and method thereof allows a telecommunications provider to enable its business and organisational customers to view, report on and analyse the expenses that have been billed (historical invoicing periods) or will be billed (real-time outstanding invoicing period) to the customer for their usage of telecommunications services (typically call charges and/or data charges and/or other charges) as agreed in their contractual arrangements, by directly ingesting call data records (CDRs) and data usage records from the network and calculating the correct invoicing based on records held in the software invention, defining those contractual arrangements.

28 Claims, 9 Drawing Sheets

(56) References Cited

U.S. PATENT DOCUMENTS

| | | | | |
|---|---|---|---|---|
| 8,340,633 B1* | 12/2012 | Rege | ............... | H04M 15/61 |
| | | | | 455/406 |
| 8,428,552 B1* | 4/2013 | Daniels | ............... | H04M 15/80 |
| | | | | 455/406 |
| 9,374,475 B1* | 6/2016 | Frazier | ............... | H04M 15/41 |
| 9,924,044 B2* | 3/2018 | Chen | ............... | G06Q 30/02 |
| 2002/0123919 A1* | 9/2002 | Brockman | ............... | G06Q 30/02 |
| | | | | 379/112.06 |
| 2002/0151293 A1* | 10/2002 | Tysor | ............... | H04L 12/2854 |
| | | | | 455/406 |
| 2005/0216421 A1* | 9/2005 | Barry | ............... | G06F 16/972 |
| | | | | 705/64 |
| 2006/0020686 A1* | 1/2006 | Liss | ............... | H04L 41/0206 |
| | | | | 709/219 |
| 2009/0291665 A1* | 11/2009 | Gaskarth | ............... | H04M 15/8355 |
| | | | | 455/405 |
| 2010/0248685 A1* | 9/2010 | Li | ............... | H04L 12/14 |
| | | | | 455/406 |
| 2012/0123870 A1* | 5/2012 | Denman | ............... | G06Q 30/0241 |
| | | | | 705/14.66 |
| 2012/0191536 A1* | 7/2012 | Chen | ............... | G06Q 30/02 |
| | | | | 705/14.49 |
| 2013/0132854 A1* | 5/2013 | Raleigh | ............... | H04W 4/60 |
| | | | | 715/738 |
| 2015/0046301 A1* | 2/2015 | Wuerch | ............... | G06Q 40/12 |
| | | | | 705/30 |
| 2016/0366575 A1* | 12/2016 | Golec | ............... | H04L 12/1428 |
| 2018/0152564 A1* | 5/2018 | Lang | ............... | H04M 15/44 |

* cited by examiner

| Contract of Business Customers –Telecommunications provider ||||||
|---|---|---|---|---|---|
| BUSS_ID | Services | TELECOM_ID | Call ( duration per minute) / data limit | Cost/data usage adjsutment | Alert type |
| abcAUXXX | Call and data plan | M001789 | 500 local calls 200 Roaming calls | 100AUD up to 500 calls (0.2AUD) and 1 AUD 501-600 calls and 1.5 AUD for 601 calls onwards Carry Forward call data | email |
| abcAUXXX | Wired line | C001790 | 5000 calls | 200AUD - 5000 calls and 1 AUD 5001 onwards calls | email |
| abcEPZZZ | Data plan | D002723 | 100 GB/month | 100GB/10 member pool 10GB every month /per member-120GB/year/per member Carry/borrow allowed (1st-month-last day-month) 200AUD/per month | Email/SMS |
| abcEPZZZ | Wi-Fi | D002723 | 1000GB/ per month | 500AUD per month/ AUD for additional 1GB | email |

FIG. 4

TELECOM INFORMATION PROCESSING SYSTEM AND METHOD THEREOF

FIELD OF INVENTION

The present disclosure relates to data processing systems and method, specifically the present disclosure relates to telecom information processing system and method thereof.

BACKGROUND

"TEMS" applications, an acronym for Telecommunications Expense Management Solutions are commonly used by enterprises (including small to medium businesses and non-profit organisations, and herein referred to also as "businesses", "subscribers" or "organisations") to view and analyse the total expenses billed to the organisation by their telecommunications provider for goods and/or services provided by the telecommunications provider. The charges include without limitation call charges and/or data charges and/or other charges. Such businesses may have tens, hundreds or thousands of devices in operation. The devices include without limitation mobile phones/cell phones, tablets, lap-tabs, and any other electronic devices which may access services provided by a telecommunications company, for example, services such as calls and data.

In general, a subscriber is required to purchase and maintain such software at its end from a software provider (who may not be the telecommunications provider itself). The software must then be installed and configured by the subscriber to receive or ingest usage data and/or invoicing data from the telecommunications provider. The software is typically managed and maintained by the subscriber as a part of its ecosystem of software applications. The usage and/or invoicing data in the TEMS can then be accessed by and displayed to the organisation in a number of ways such as dashboards, charts, time-series graphs, etc. The software thus typically enables the data to be analysed for trends, outliers and issues such as individual employees with a high spend, high data usage, high roaming usage and so on. The TEMS software may also provide data to internal accounting systems to provide cost allocation of the organisations' spend across various cost centres within the organisation.

BRIEF DESCRIPTION OF DRAWINGS

FIG. 4 illustrates an exemplary table of contracts between one or more subscribers and a telecommunications provider according to an implementation consistent with the principles of the present invention

DESCRIPTION

Figure 1:
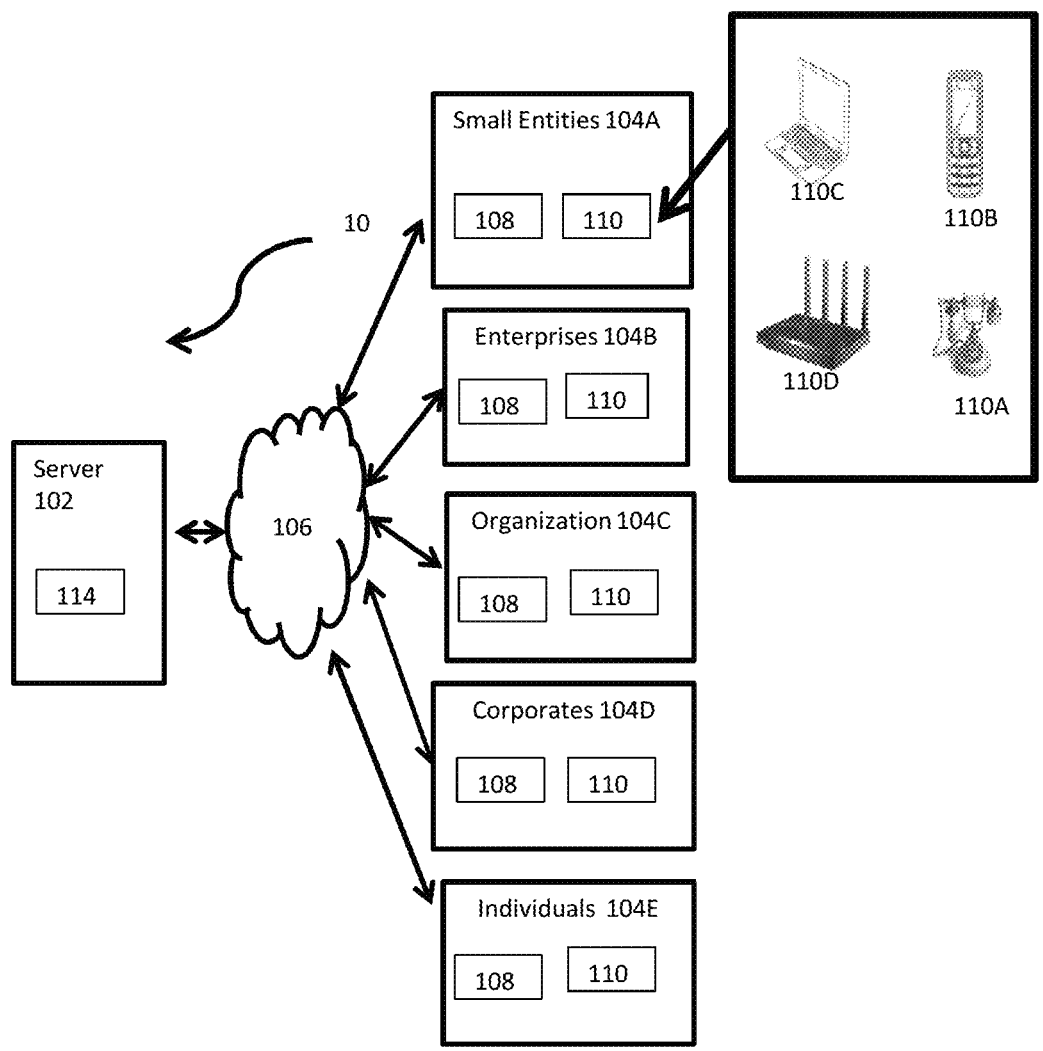
FIG. 1 illustrates a first exemplary diagram of an expense management system consistent with the principles of the present invention

Methods and systems for telecom information processing are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

The embodiments as described below can be implemented as methods, apparatus, systems, and computer program products. It should be understood that each module described below may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the modules.

These computer program instructions may also be stored in a computer-readable memory that can direct a computer or other programmable data processing apparatus to function in a particular manner as disclosed in the modules, such that the instructions stored in the computer-readable memory produce an article of manufacture including computer-readable instructions for implementing the functionality specified. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified below.

Further, applications, software programs or computer readable instructions may be referred to as components or modules. Applications may be hardwired or hardcoded in hardware or take the form of software executing on a general purpose computer such that when the software is loaded into and/or executed by the computer, the computer becomes an apparatus for practicing the invention, or they are available via a web service. Applications may also be downloaded in whole or in part through the use of a software development kit or a toolkit that enables the creation and implementation of the present invention. In this specification, these implementations, or any other form that the invention may take, may be referred to as techniques. In general, the order of the steps of disclosed processes may be altered within the scope of the invention.

A telecom information processing system (and method) and an expense management system (and method) relate to the same invention and are interchangeably used in the present disclosure.

In the exemplary embodiments elaborated below, the expense management system provides a different and unique approach to meet an organisation's need to view and/or analyse their telecommunications spend and/or load this data into other systems such as an enterprise resource planning (ERP) system or an accounting system.

The expense management system works directly with a telecommunications provider's software ecosystem to acquire and ingest all relevant usage data/telecom data for one or more telecom devices, including call data records and mobile data session records, directly from network data and not from an invoicing system for all enterprises and/or subscribers of the telecommunications provider. Thus, a telecommunications provider is enabled to provide the equivalent of a TEMS to every single subscriber without the customer engaging a third party to provide the TEMS software. In an embodiment, a telecommunications provider offers the expense management system as a service offering to its business and/or enterprise customers. In this way, rather than the organisation licensing a TEMS from a third party software provider, the organisation gets access to equivalent TEMS functionality provided by the telecommunications provider. The subscriber can thus access associated data and/or reporting functionality and/or data analytics directly.

The expense management system solves a number of problems often faced by telecommunications providers with respect to invoicing their subscribers, as explained in the following paragraphs.

In an embodiment, the expense management system may generate invoice using mapped contract configuration parameters as described below and provide the invoice to a telecommunications provider or a subscriber.

In another embodiment, the expense management system may provide the mapped contract configuration parameters to the telecommunications provider or the subscriber who in turn may use the details to generate the invoice.

The expense management system keeps a track of one or more negotiated contracts between the telecommunications provider and one or more of its subscribers. A negotiated contract may include without limitation rates and/or deals like invoicing in aggregate for multiple devices, invoicing for devices making full or partial usage of a shared "pool" of data and/or call minutes, separate pools for roaming data (international data access), international calls and/or roaming calls (calls made from an international location or a location not served by the telecommunications provider).

In various embodiments, the expense management system may be configured as a single installation/instance or multiple installations/instances running together.

Referring to FIG. 1 illustrates an exemplary diagram of the environment 10 of an expense management system consistent with the principles of the invention. The environment 10 includes a server 102, one or more clients 104A, 104B, 104C, 104D, 104E and network 106. In this embodiment, the expense management system 114 is resident on the server 102 of a telecommunications provider and one or more clients 104A, 104B, 104C, 104D ("subscribers") communicate with the server 102 via the network 106.

The "server" 102 is typically a remote computer system on which the expense management system 114 is installed and is accessible over the network 106 such as the Internet. The server 102 essentially acts as an information provider to one or more clients 104A, 104B, 104C, 104D, 104E. In various embodiments of the present invention, the server may be a cloud-server, a content server, an application server, a web server, a virtual server or an equivalent device that is capable of accessing network environment based upon a request received from the client and accordingly fetches the content. The server 102 hosts the expense management system 114 to acquire and ingest all relevant usage data, including call data records and mobile data session records, directly from a network/telecom data for one or more telecom devices and not from an invoicing system for all enterprises and/or subscribers of the telecommunications provider. The network/telecom data without limitation include communication data records like one or more call data records (CDR) and/or data session records such as data session records for web-browsing associated with real-time location of the one or more telecom devices. The telecom devices include without limitation mobile phones/cell phones, tablets, lap-tabs, and any other electronic devices which may access services provided by a telecommunications provider.

Further, the expense management system 114 keeps a track of one or more contracts negotiated between the telecommunications provider and one or more of its subscribers. A negotiated contract may include without limitation rates and/or deals like invoicing in aggregate for multiple devices, invoicing for devices making full or partial usage of a shared "pool" of data and/or call minutes, separate pools for roaming data (international data access), international calls and/or roaming calls (calls made from an international location or a location not served by the telecommunications provider).

The expense management system 114 is configured to fetch accurate bills for one or more telecom devices as per the contracts, thereby solving a prolonged problem of inaccurate invoicing by telecommunications providers which may either lead to overinvoicing, impacting customer satisfaction, or to under invoicing, leading to revenue leakage which can be a significant cost to the telecommunications providers.

Further, the expense management system 114 facilitates analysis of an accurate and up-to-date view of unbilled period in real-time corresponding to one or more telecom devices that belong to one or more subscribers taking into consideration the terms of the contracts agreed between one or more subscribers and historical invoicing periods.

Additionally and optionally, the expense management system 114 may generate invoicing reports of the telecom/network data used by the one or more telecom devices of the one or more subscribers on request made on a request date or as per an invoice cycle as per the teachings of the present disclosure. In an embodiment, the request date may be any date other than the date of the invoice cycle.

In an embodiment, the expense management system 114 captures the telecom/network data for one or more telecom devices 110 via the network 106 in real-time or periodically (say 1 hour). Alternatively, the expense management system 114 is configured to analyse captured telecom/network data for the one or more telecom devices and create a invoice in real-time depending on one or more contracts of the one or more subscribers as per the teachings of the present disclosure.

Figure 3:
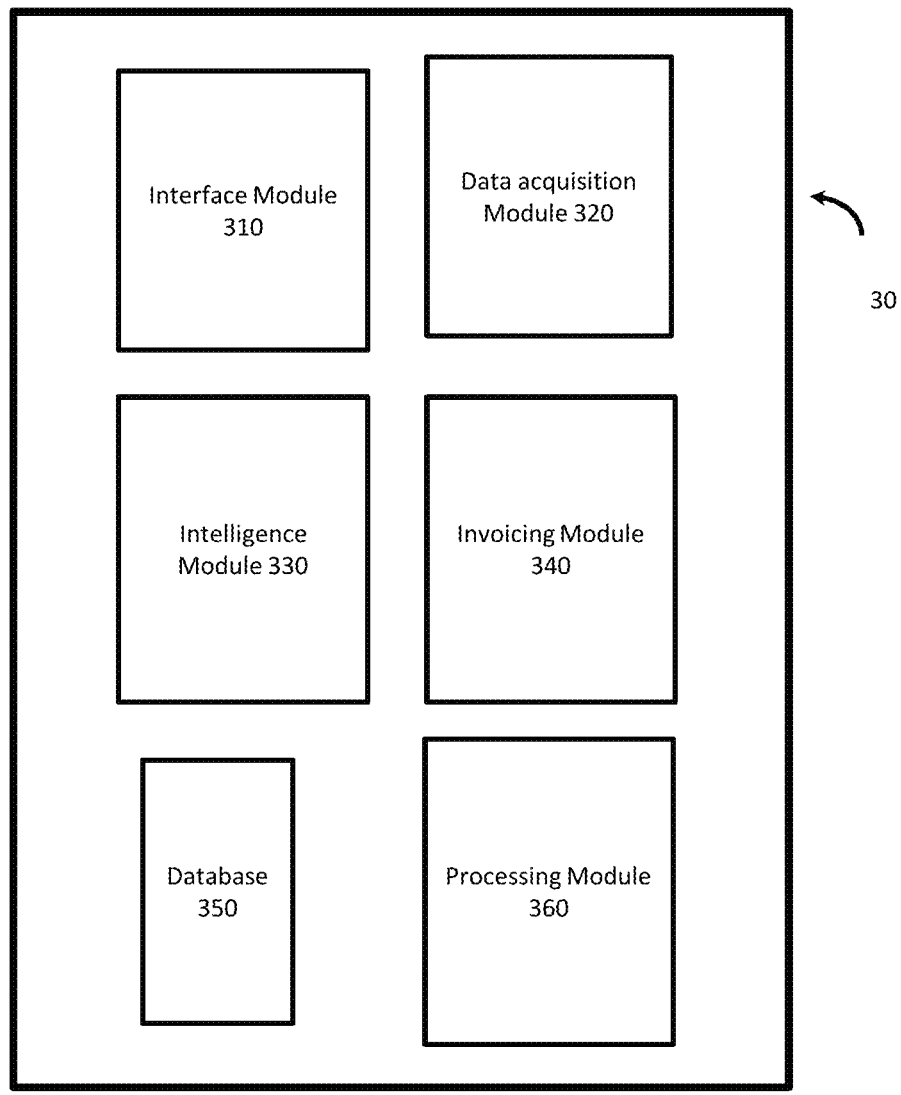
FIG. 3 illustrates the modular diagram of the expense management system in accordance with an embodiment of the present invention

The expense management system 114 includes various modules such as a data acquisition module, a database, an intelligence module, an invoicing module (or billing module), and a processing module as described in detail in FIG. 3.

In an embodiment of the present invention, the server 102 may operate as a web server and host one or more web applications. The web server 102 may include a computational device for example, a dedicated computer that responds to the requests of one or more clients 104 and has data processing capability. The web application may be any computer-based software application or webpage that may be hosted by the server 102 and accessed by client 104 via computer network 106, such as the Internet.

A client 104 is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the server program or the server itself. The client process usually runs on a computer that accesses shared network resources provided by another computer running a corresponding server process.

The client 104 may be a computing device such as a wireless telephone, a personal computer, a personal digital assistant (PDA), a laptop, a tablet or another type of computation and/or communication device, a thread or process running on one of these devices, and/or an object executable by one of these devices.

The client 104 may include a client software such as the web browser 108 like Firefox, Chrome, Internet Explorer, Safari, Opera etc. to correspond with the server 102. Alternately, a computer program such as a web application, a mobile application, a software application, a widget, or the like resides on the client that is used to correspond with the server 102. In a typical scenario, a user (third party provider/customer) of the client 104 using a web browser 108 may send a request for a web application (by URL, link within an email, link within a web page, or otherwise) to the server 102. In an embodiment, the communication may be established using an Internet Protocol for example, an hypertext transfer protocol (HTTP)/hypertext transfer protocol secure (HTTPS), file transfer protocol (FTP), etc.

Figure 1A:
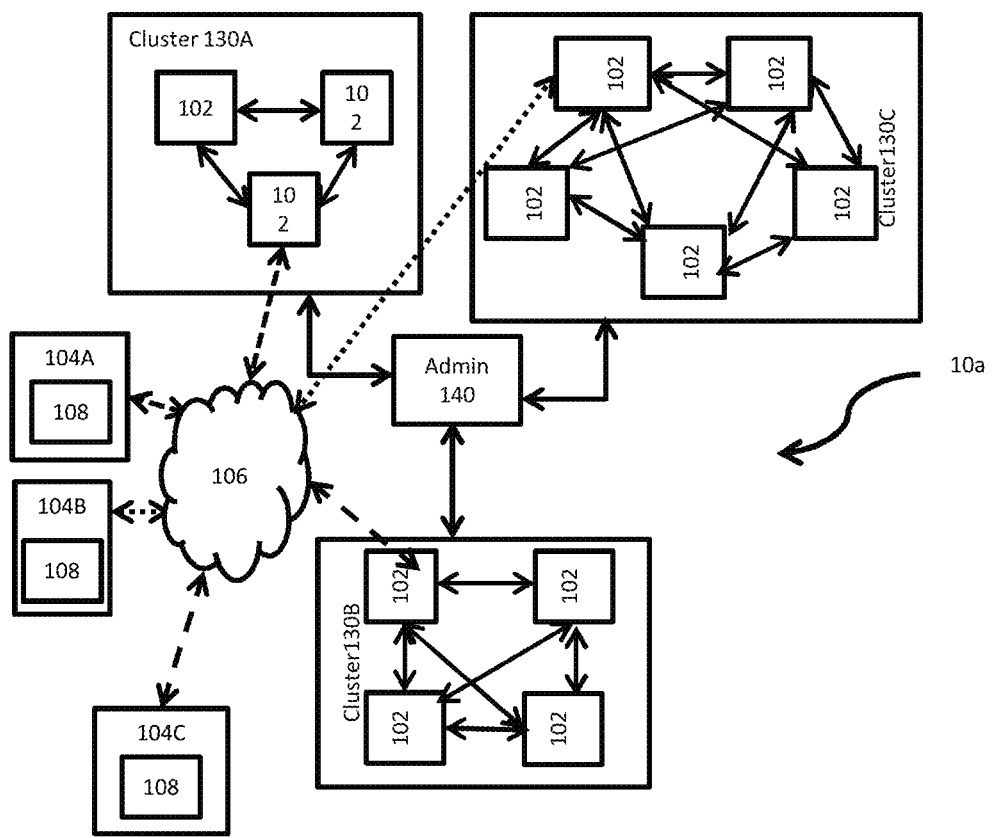
FIG. 1a illustrates a second exemplary diagram of an expense management system consistent with the principles of the present invention

The one or more client devices 104A, 104B, 104C, 104D without limitation include one or more subscribers such as a business customer, an organisation, a corporate, a non-profit entity, a non-individual customer, an enterprises, a small to medium business, an individual, etc. (herein after may be referred as "users"). As depicted in FIG. 1, the one or more subscribers include one or more small entities 104A, one or more enterprises 104B, one or more organisations 104C, one or more third party retailers 104D and one or more individuals 104E who wish to view invoicing expenses in real-time of the one or more telecom devices 110 through the expense management system 114 as depicted in FIG. 1a Thus, the expense management system 114 aids in saving infrastructure/resources of the one or more subscribers ('clients'). Further, one or more clients include one or more telecom devices that use the services of the telecommunication provider as per the teachings of the present disclosure. The one or more telecom devices 110 include without limitation one or more 110A mobile devices, one or more wired telephones 110B, one or more laptops 110C, or one or more wireless modems 110D that belong to one or more subscribers as shown in FIG. 1A.

The one or more client devices 104A, 104B, 104C, 104D and the server 102 have been illustrated as communicating via the network 106 for simplicity. In practice, there may be more clients and servers. Also, in some instances, a client may perform the functions of a server and a server may perform the functions of a client.

The network 106 establishes communication between the server 102 and the one or more client 104A, 104B, 104C, 104D. The network 106 used may be a global area network (GAN), such as the Internet, a wide area network (WAN), a local area network (LAN), or any other type of network or combination of networks. The network 106 may provide for wireline, wireless, or a combination of wireline and wireless communication between devices in the network. In some embodiments of the invention, the network 106 described herein may be a cloud computing network or the network may be a WiFi network, Bluetooth, or networks provided by cell towers such as 2G, 2.5G, 3G, 4G, 5G, etc.

Referring now to FIG. 1a, which illustrates a second exemplary environment in which the teachings of the present disclosure may be practiced. The environment 10a of the expense management system (EMS) 114 architecture may include one or more server clusters 130A, 130B, 130C, an administrator 140 and one or more clients 104A, 104B, 104C in communication with the one or more server clusters 130A, 130B, 130C as per the teaching of the present invention. Although, only three server clusters 130 are shown in FIG. 1a, no limitation of the principles of the invention is intended. Such system environment 10b may include any number of server clusters 130 and have any number of clients 104 in communication with those clusters 130.

Each server cluster 130A, 130B, 130C is a logical group of one or more servers 102 (hereinafter referred to generally as server 102 or servers 102) that are administered as a single entity. The servers 102 within each cluster can be heterogeneous. That is, one or more of the servers can operate according to one type of operating system platform (e.g., WINDOWS NT, manufactured by Microsoft Corp.), while one or more of the other servers 102 can operate on according to another type of operating system platform (e.g., Unix or Linux). Each server cluster does not need to be physically proximate to other server in its cluster. Thus, the group of servers 102 logically grouped as a server cluster 130A, 130B, 130C may be interconnected using the network 106. By way of example, a server cluster may include servers 102 physically located in different regions of a state, city, campus, or room. Example of server cluster 130A, 130B, 130C includes distributed system architecture for handling volume requests to one or more servers 102.

An administration tool 140 may be used to modify or create rules, group rules into load evaluators, or display the results of a load evaluation for a particular server 102. Further, the administration tool 140 on receiving a client 104A request identifies the server cluster 130B and thereafter selects the server 102 from a group of servers 102 in the said server cluster 130B for routing the client 104A request as depicted in FIG. 1A. In an embodiment, while interpreting the client 104A request, the admin 140 without limitation analyses location of client, nearest server cluster so that faster response may be received, number of client requests handled by each server 102 in the identified server cluster for load management, type of information requested such as (service type/location of one or more telecom devices 110) etc. Once the administration tool 140 identifies the server 102, the administration tool 140 forwards the request of the client 104A to the server 102. The server 102 in conjunction with the expense management system 114 responds to the request through the web browser 108 as per the teachings of the present invention.

Similarly, an administrator can use the administration tool 140 to query load information of each server 102 and display this load information in accordance with a particular requested view. For example, the administrator may display overall server load, the value of a particular operational meter or rule at a particular time, or some combination of these views. In one embodiment, the administrator may "test" the Load Management System (LMS) by requesting the LMS to perform a server load calculation and display the server to which the client 104 would have been connected had a client made a request. The load information displayed by a monitoring system may include current as well as historical data (e.g., processor and memory utilization, page fault occurrences) for a particular server 102 or application.

The expense management system 114 may include a data acquisition module, a database, an intelligence module, a invoicing module, and a processing module as to allow a telecommunications provider to enable its business and organisational customers to view, report on and analyse the expenses that have been billed (as per historical invoicing periods) or will be billed (as per real-time outstanding invoicing period) to the one or subscribers for usage of telecommunications services for one or more telecom devices as agreed in the contractual arrangements in a manner consistent with the principles of the invention. These will be further explained in FIG. 3.

For example, the client 104A may communicate with a server of the server cluster 130B through the network 106. The client 104A may, for example, request for information/content through a web browser 108 from the expense management system (EMS) 114. The web browser 108 running on one or more clients 104A, 104B, 104C establishes communication with an expense management system 114 via a web application (not shown) located on a web server 102 through the network 106 are depicted in FIG. 1a. However, it would be apparent to a person skilled in the art that several elements may be employed as per the teachings of the present disclosure. Client 104 may connect to network 106 via wired, wireless, optical or any other type of connection that allows communication. The subscriber of the client 104 may place a request via the web browser 108 to obtain a report of unbilled invoice amount and/or network data usage in real-time, for one or more telecom devices 110 enrolled with the expense management system 114 of the telecommunications provider. The expense management system 114 processes the request and fetches required telecom/network data. Thereafter, the expense management system 114 processes the request using this data and the contracts applicable to the request to generate an invoice. The expense management system 114 sends the subscriber one or more alerts (email/SMS) of the billed amount.

Additionally and optionally, the expense management system 114 allows the registration of the one or more subscribers. Moreover, the expense management system 114 allows the one or more subscribers to negotiate/revise one or more contract terms initially at the time of enrolling with the EMS 114 or at any instance during the use of the expense management system 114. Alternatively, the expense management system 114 may update contract fields for one or more telecom devices as stored in the server 102 of the expense management system 114. The contract field includes without limitation one or more service such as incoming calls duration-per call charges/outgoing call-per call charges, number of calls allowed for one or more telecom device such as telecom device 110 used by a marketing person, number of calls allowed per month, data usage limit, term of contract etc. The data usage limit may be variable for different users of a company as defined by the company.

Figure 1B:
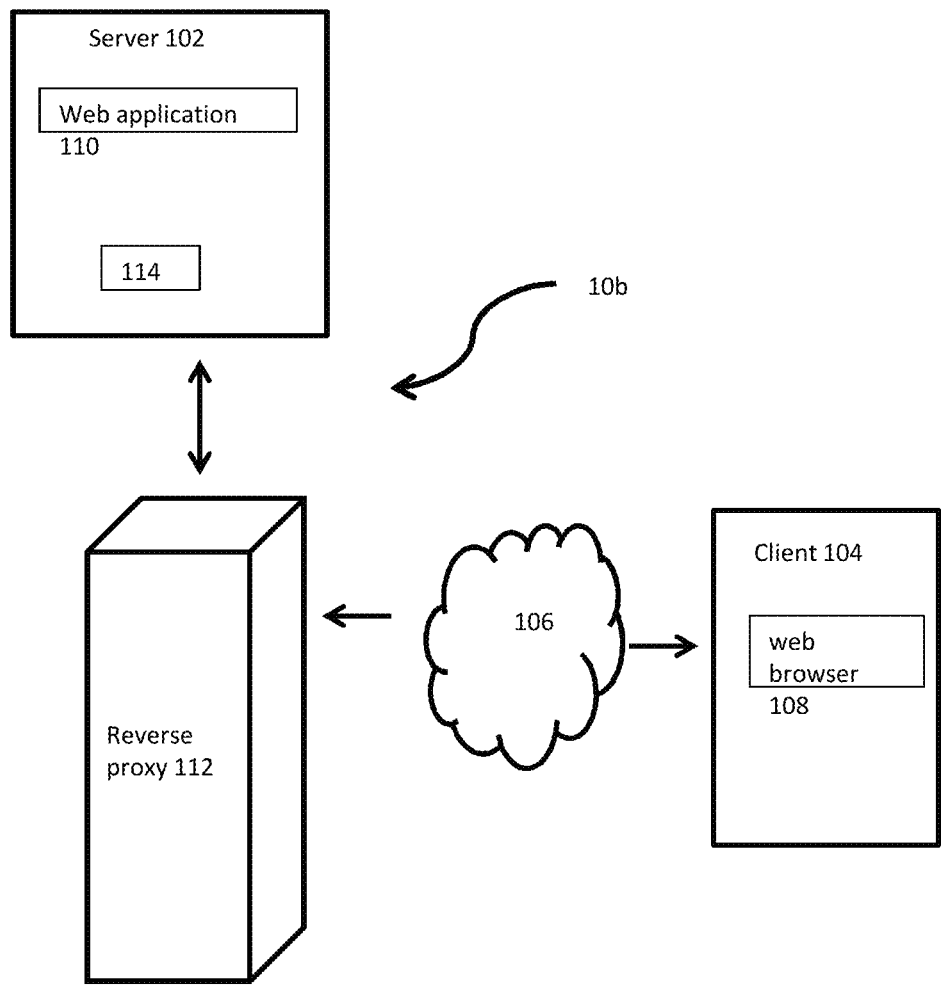
FIG. 1b illustrates a third exemplary diagram of an expense management system consistent with the principles of the present invention

Referring now to FIG. 1(b), which illustrates a third exemplary environment in which the teachings of the present disclosure may be practiced. The environment 10b includes a web browser 108 running on one or more clients 104A, 104B, 104c, 104D that establishes communication with the expense management system 114 via a web application 110 located on a web server 102 via a reverse proxy server 112, through the network 106. For ease of understanding, single hardware elements like client, web server, reverse proxy, etc. are depicted in FIG. 1(b), however, it would be apparent to a person skilled in the art that several such elements may be employed as per the teachings of the present disclosure.

The web server 102 may include a computational device for example, a dedicated computer that responds to the requests of one or more clients 104 and has data processing capability.

Client 104 and reverse proxy server 112 may connect to network 106 via wired, wireless, optical or any other type of connection that allows communication.

The reverse proxy server 112 and the web server 102 may connect via wired, wireless, optical or any other type of connection that allows communication. A reverse proxy server 112 is a server with data processing and communication capabilities on which the teachings of the present disclosure are implemented.

In an embodiment, the web server 102 may receive a client 104 request via the reverse proxy server 112 and send its response to the client 104 via the reverse proxy server 112. Alternately, the server 102 may receive a client 104 request directly and send its response to the client 104 via the reverse proxy server 112.

Figure 1C:
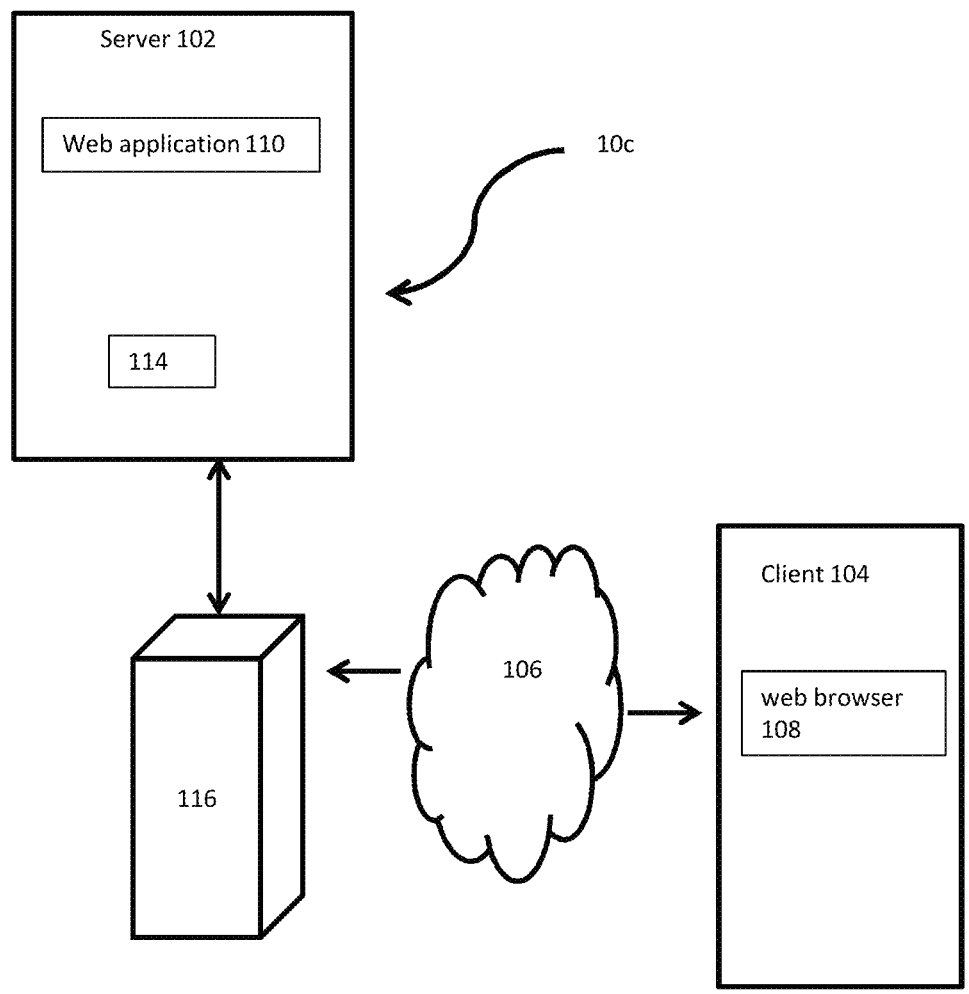
FIG. 1c illustrates a fourth exemplary diagram of an expense management system consistent with the principles of the present invention

Alternatively, the expense management system 114 may be placed at a geographic location different from that of the web server 102 in which case, rather than the reverse-proxy server, a collaborating proxy server exists as depicted in the environment 10b of FIG. 1(c).

As shown in the FIG. 1(c), it illustrates a fourth exemplary environment in which the teachings of the present disclosure may be practiced. The environment 10c includes the web browser 108 running on the client 104 may establish communication with the expense management system 114 hosted on the server 102 via a collaborating proxy server 116 through the network 106. The collaborating proxy server 116 may communicate with the expense management system 114 on which the teachings of the present disclosure may be implemented. Examples of the collaboration proxy server 116 include without limitation, the expense management system 114 being co-located or in-front of a web infrastructure element, such as web application firewalls (WAF), load balancers, or application proxies of any kind.

The expense management system 114 may not access network environment based upon a request received from one or more clients 104A, 104B, 104C, 104D, 104E or may not fetch the content from the server 102 directly, rather may rely on the collaborating proxy server 116 for fetching/updating the content. The collaborating proxy server 116 may capture the network environment and forward the request/data/content from the one or more clients to the expense management system 114. In each response sent to the web browser 108, the expense management system 114 may provide content such as, report on the expenses that have been billed (as per historical invoicing periods) or will be billed (as per real-time outstanding invoicing period) to the one or subscribers for usage of telecommunications services for one or more telecom devices as agreed in the contractual arrangements etc. to be displayed at the client 104 as per the teachings of the present invention.

It should be noted that the above four embodiments are exemplary. Other implementations of the expense management system 114 employed in conjunction with the present invention are within the scope of the present disclosure.

Figure 2:
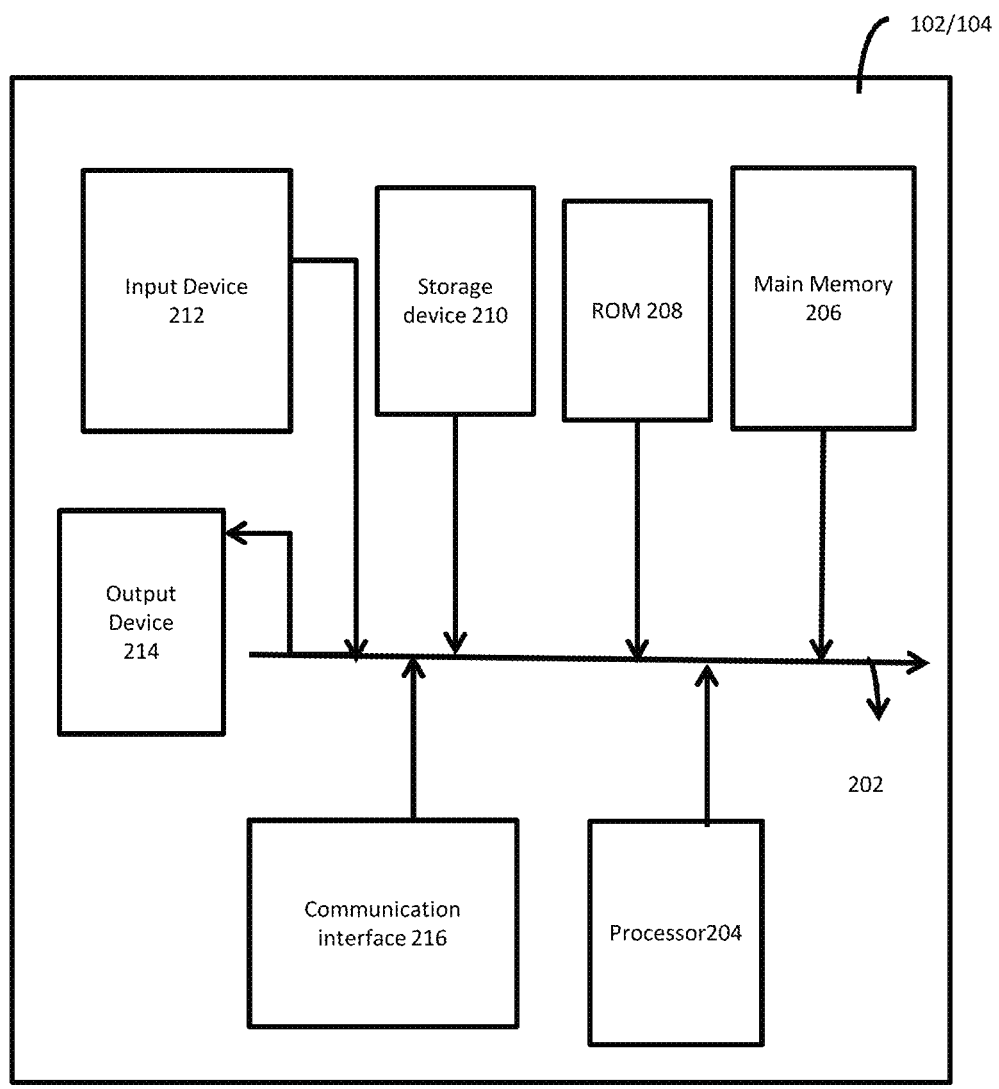
FIG. 2 illustrates an exemplary diagram of a server 102 or client 104 according to an implementation consistent with the principles of the invention

FIG. 2 is an exemplary hardware component diagram of the server 102 or client 104 according to an implementation consistent with the principles of the invention. The server/client 102/104 may include a bus 202, a processor 204, a main memory 206, a read only memory (ROM) 208, a storage device 210, one or more input devices 212, one or more output devices 214 and a communication interface 216.

The bus 202 may include one or more conductors that permit communication among the components of client/server 102/112.

The processor 204 may include any type of conventional processor or microprocessor, or a combination of processors, that interprets and executes instructions.

The main memory 206 may include a random access memory (RAM) or another type of dynamic storage device that stores information and instructions for execution by processor 204.

The ROM 208 may include a conventional ROM device or another type of static storage device that stores static information and/or instructions for use by processor 204.

The storage device 210 may include a magnetic and/or optical recording medium and its corresponding drive.

The input device(s) 212 may include one or more conventional mechanisms that permit a user to input information to server/client 102/104, such as a keyboard, a mouse, a pen, a touch screen, voice recognition and/or biometric mechanisms, etc.

The output device(s) 214 may include one or more conventional mechanisms that output information to the user, including a display, a printer, a speaker, etc.

The communication interface 216 may include any transceiver-like mechanism that enables server/client 102/104 to communicate with other devices and/or systems. For example, the communication interface 216 may include mechanisms for communicating with another device or system via a network, such as network 106.

The software instructions defining expense management system 114 and/or browser software 108 may be read into memory 206 from another computer-readable medium, such as data storage device 210, or from another device via the communication interface 216. The software instructions contained in memory 206 causes processor 204 to perform processes that will be described later. Alternatively, hardwired circuitry may be used in place of or in combination with software instructions to implement processes consistent with the principles of the disclosure. Thus, implementations consistent with the principles of the disclosure are not limited to any specific combination of hardware circuitry and software.

FIG. 3 illustrates a modular diagram of the expense management system 114 in accordance with an embodiment of the present invention. The expense management system 114 includes various modules without limitation, an interface module 310, a data acquisition module 320, an intelligence module 330, an invoicing module 340, a database 350, a, and a processing module 360. In other embodiments, the expense management system 114 may comprise a subset of one or more of the depicted modules 310, 320, 330, 340, 350, and 360 or the like.

Interface module 310 is configured to provide an interface for the clients 104A, 104B, 104C, 104D, 104E to enable interaction between the subscriber/users and the expense management system (EMS) through one or more graphical icons and/or visual indicators displayed on the interface. In an embodiment, the interface module 310 presents an interface to a subscriber to register with the expense management system 114. Further, the interface module 310, post registration, may provide various interfaces to the one or more subscribers to enrol/view details of the one or more telecom devices. The subscriber may be required to enrol telecom devices corresponding to an agreed contract between the subscriber and the telecommunications provider.

The interface module 310 without limitation may include fields corresponding to the profile of a subscriber and/or contract configuration parameter. The subscriber profile field includes without limitation name of an entity, business type (say, sole trader, partnership, company or trust), phone number, email, contact information of the business entity-representative, administrator name/email/contact (administrator is the user of telecom device in case of individual subscriber/clients 104) etc. The contract configuration parameter field for a subscriber includes without limitation contact number of one or more telecom devices 110, category of the telecom devices (mobile/wired phones/wireless modems etc.), services corresponding to one or more telecom devices 110 (incoming/outgoing calls/national roaming/international roaming/network data), telecom data duration (talk time)/cost (calls/duration/cost), network data size/cost (download/upload limit/cost), term of contract, late payment interest, administrator permission (stop call/data plan for one or more telecom devices 110) etc. The contract configuration parameters may also correspond to invoicing rates associated with the telecom usage data, invoicing offers for a group of the one or more telecom devices, invoicing rates associated with real time location of the one or more telecom devices, invoicing rates associated with call duration, invoicing rates associated with the telecom devices operating in locations served by other telecom service providers, data packet volumes, call data volumes (talk time) invoicing rates for the telecom devices making full or partial usage of a shared pool of data or allocated call duration or invoicing rates for network data.

The interface module 310 is configured to display the telecom/network data that has been billed (say, historical invoicing periods/paid bills) or will be billed (say, real-time outstanding invoicing period/amount) to a subscriber for the usage of the telecommunications provider's one or more services by the one or more telecom devices of the subscriber.

Additionally and optionally, the interface module 310 includes a notification area on the interface in which an alert relating to call data/network data reaching the prescribed limit (as agreed in the contract) is displayed. The interface module 310 may also provide an interface to the subscriber to view invoicing expenses in real-time for the services used by the one or more telecom devices through the telecommunication provider as per the teachings of the present invention.

The data acquisition module 320 directly acquires telecom/network data from a telephone exchange or other telecommunications equipment before this data is processed by an invoicing module 340. Such acquired telecom/network data includes without limitation call data record (CDR)

data and data session record data or data records like data relating to billable activities or events. The call detail record (CDR) is a data record produced by a telephone exchange or other telecommunications equipment that documents the details of a telephone call or other telecommunications transaction (e.g., text message) that passes through that facility or device. The record contains various attributes of the call, such as time, duration, completion status, source number, and destination number. The expense management system 114 is configured to receive the network/telecom data with date/time stamp for example, periodically or only when the data is requested by one or more subscribers 104.

The data acquisition module 320 may further obtain the network environment information from a telephone exchange or other telecommunications equipment periodically or when a request is received from the one or more clients 104A, 104B, 104C, 104D 104E. The network environment information includes without limitation network type, network speed, bandwidth, etc.

The intelligence module 330 compares as well as maps the telecom/network data based upon actual telecom/network data used, historical telecom/network data used and/or contractually permitted telecom/network data. The intelligence module 330 is configured to view, report on and analyse the telecom/network data that has been billed (say, historical invoicing periods/paid bills) or will be billed (say, real-time outstanding invoicing period/amount) to a subscriber for the usage of the telecommunications provider's one or more services by the one or more telecom devices of the subscriber. The analysis of telecom/network data that has been billed include without limitation analysis of a historical data of a customer's usage for any or all of the services provided by the telecommunications provider for a historical period. The analysis of telecom/network data to be billed include without limitation analysis of unbilled period-to-date usage (say month-to-date, where "month" represents a invoicing cycle, regardless of which day of the month this cycle may commence and finish).

In an embodiment, the intelligence module 330 aggregates the telecom/network usage of the one or more telecom devices 110 of a subscriber and evaluates this aggregated data against the usage limit and/or other parameters of the shared pools negotiated in a contract (contract configuration parameter).

The invoicing module 340 processes two sets of data (actual usage data, and contract configuration parameter) to calculate correct invoicing to the subscriber, based on the conditions in the contract and the usage as mapped by the intelligence module. The invoicing module 340 generates an invoice for the subscriber(s) (individual or aggregated invoices) as agreed in the negotiated contract taking into account one or more variables which are configured as part of the contract (contract configuration parameter), and/or the telecom/network data usage of the one or more telecom devices 110 (actual usage data). The invoicing module 340 may generate invoicing for the subscriber on request or as per an invoice cycle. Subsequently, the interface module 310 is configured to display the analysis of the current unbilled amount for the determined invoicing period and the historical billing periods in a graphical format, a tabular format, a spreadsheet format, charts, or a combination thereof as per the request received from one or more subscribers.

Individual invoice refers to an invoice for telecom/network data used by one telecom device. Aggregated invoice refers to a single invoice that contains aggregated telecom/network data used by at least two telecom devices enrolled against one subscriber.

The database 350 stores one or more contracts of one or more subscribers with the telecommunications provider. In addition, the database may contain one or more look-up tables to map the subscribers and contract details. The contract details include without limitation one or more variables which can be configured as part of a contract, aggregate usage across one or more devices and services, invoicing pattern/rates or prices for domestic calls, international calls, roaming calls, domestic data packet volumes, roaming data packet volumes and/or other goods and/or services, and invoicing for devices making full or partial usage of a shared "pool" of data and/or call minutes. Further, the database 350 is used to store profiles of one or more subscribers and/or one or more contract configuration parameter. Additionally, the database 350 also includes one or more look up tables to stores one or more reports/data generated corresponding of one or more telecom devices 110 and the invoicing module 340 information.

The processing module 360 coordinates the functioning of all modules.

Figure 5:
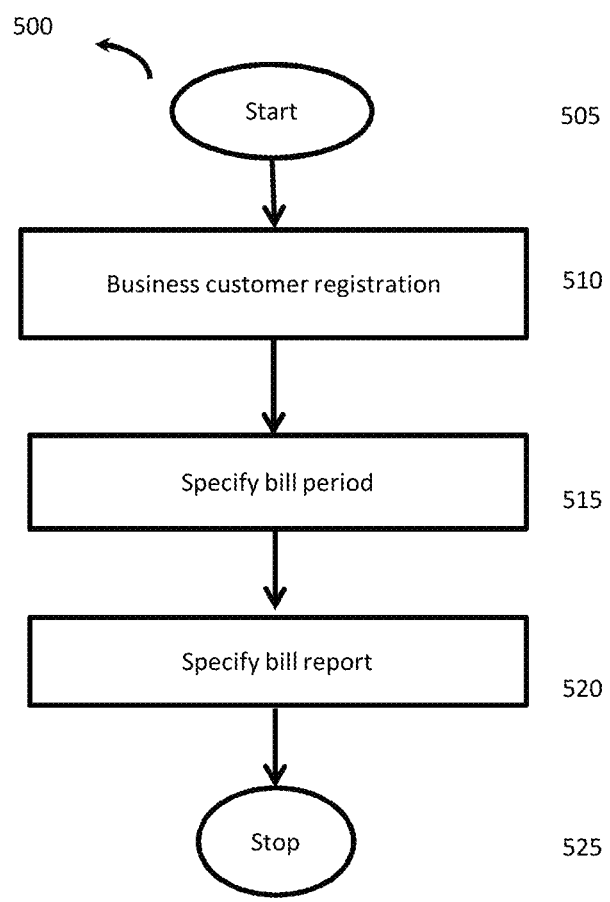
FIG. 5 illustrates an exemplary flowchart 500 depicting registration process followed by a subscriber on the expense management system 114.

Referring to FIG. 5, it illustrates an exemplary flowchart 500 depicting a registration process followed by a subscriber on the expense management system 114.

The process commences at step 505. The user (administrator/subscriber) of the client 104 is provided with an option to register at step 510. In an embodiment, the user fills the registration fields as per details mentioned in FIG. 3. In an exemplary embodiment, the expense management system 114 may request the user to fill the login credentials during the first time. Thereafter, the user may enter the same login credentials to access the EMS 114. In an embodiment, the expense management system 114 is configured to force the subscriber of the expense management system 114 to change the password or pin for adhering to the security of telecom data/network data/profiles of the subscribers.

In an embodiment, in case the administrator/the subscriber forgets the login details during subsequent a login, the expense management system is configured to send the login details to the registered email/mobile as stored in the database of telecommunications provider or a link to generate a new password.

Upon registration, the subscriber may enter information corresponding to the subscriber profile fields and/or contract configuration parameter fields for one or more telecom devices 110. Additionally, the subscriber may provide call/data limits corresponding to one or more telecom devices 110. In case there are any default values in said fields, the subscriber may overwrite the same.

At step 515, the subscriber may set an invoicing period for one or more telecom devices 110 and corresponding optional alerts to be provided in the interface of the expense management system. In an embodiment, the subscriber provides a common invoicing date for one or more telecom devices through the interface of the expense management system 114 on which the bills/reports are to be generated.

At step 520, the expense management system is configured to ask the subscriber to select a preferable format of the bill/report to be generated at the end of the invoicing period. Once all the information is received during the registration process, in an embodiment, the expense management system 114 is configured to assign each subscriber a unique Id (BUSS_ID). Further, each telecom device is assigned a telecom serial identification ID (TELECOM_ID) which may include a unique code corresponding to the subscriber to which the telecom device belongs. As depicted in FIG. 4, a contract table includes two subscribers' details with BUSS_ID namely, "abcAUXXX" and "abcEPZZZ". Also, TELECOM_ID "M001789" and "C001790" correspond to a common BUSS_ID "abcAUXXX" indicating that the two devices belong to the same subscriber.

The process stops at step 525.

Figure 6:
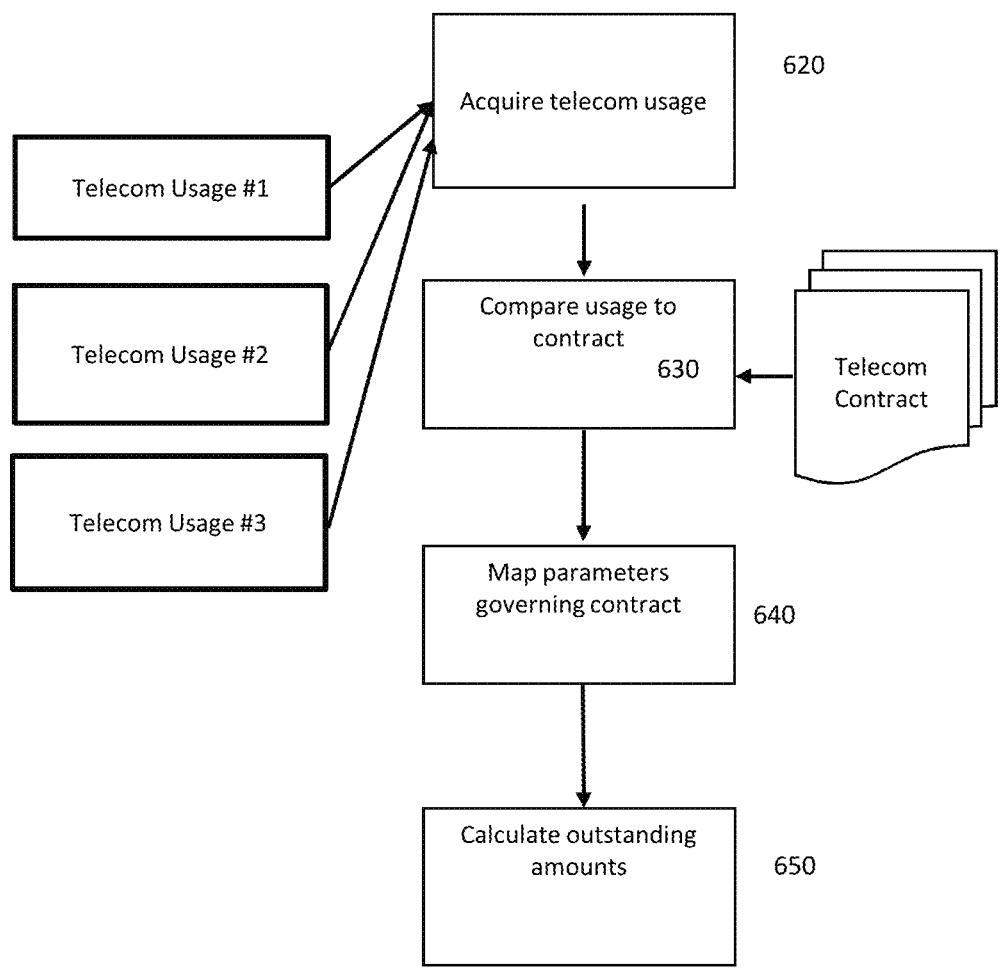
FIG. 6 illustrates a flowchart 600 depicting functioning of the expense management system 114 consistent with the teachings of the present invention.

FIG. 6 illustrates a flowchart 600 depicting exemplary functioning of the expense management system 114 consistent with the teachings of the present invention.

The process commences at step 610. The expense management system 114 is configured to receive and ingest telecom/network data of the one or more telecom devices (#1, #2, #3) of a subscriber that have subscribed to the product/services of the telecommunications provider as shown at step 620. The expense management system 114 may receive the telecom/network data due to completion of a preconfigured invoice cycle, say 1 month or as per a user's request or as per a preconfigured tracking duration. In an embodiment, the expense management system 114 receives the telecom/network data from a telephone exchange or a telecommunications equipment.

The expense management system 114 is optionally configured to store the telecom/network data with a date and time stamp corresponding to the one or more services opted as per the contractual agreement for each telecom ID in for example, look up tables provided with the server 102.

At step 630, the expense management system 114 is configured to compare the acquired telecom/network data corresponding to the one or more telecom devices 110 in step 620 with the amount of data configured in the contract (contract configuration parameter). In an embodiment, during comparison, the expense management system 114 is configured to compare call data/data session records utilized by each telecom device while accessing the one or more services with the contractual telecom/network data (call data/data session records) for the one or more services for that telecom device.

The EMS 114, upon comparison of the amount of used data (namely, the acquired telecom/network data) with the contractually permitted data, performs an action using analysis of the historical telecom/network data. For example, if the amount of used data is more than the contractually permitted data, then the EMS 114 checks for any buffer data carried forward as per the analysis of the historical telecom/network data for that telecom device/subscriber.

Alternately, if the amount of data used is less than the contractually permitted data, then the EMS 114 may either add the buffer data to be carried forward as part of the historical telecom/network data for that telecom device/subscriber to be used in later billing cycles. Before doing so, the EMS 114 may check if the request date is the billing cycle date. However, if the request date is before the billing cycle date, the EMS 114 may proceed to the step 640 for invoicing if requested or send a message to the telecom device/subscriber providing usage update and/or amount of buffer data available.

Yet alternately, if the amount of data used is equal to the contractually permitted data, then the EMS 114 checks for the historical telecom/network data and may proceed to the step 640 for invoicing if requested or send a message to the telecom device/subscriber providing usage update and/or amount of buffer data available.

In an exemplary embodiment, the expense management system 114 is configured to perform a comparison as per a preconfigured tracking duration, say every 2 days, to keep a track of the telecom/network data used by the one or more telecom devices 110. This may enable the EMS 114 to provide timely notifications to the subscriber in case the actual usage exceeds the preconfigured contract configuration parameter. Also, such a comparison enables the expense management system 114 to keep an update on available or overused telecom/network data assigned to the respective telecom device.

Additionally and optionally, after comparison, the expense management system 114 is configured to store the aforesaid details in the database at the server 102 to avoid recalculation.

At step 640, the expense management system 114 is configured to map one or more contract configuration parameters like invoicing rates, corresponding to the telecom/network data used by a telecom device/subscriber to yield one or more mapped contract configuration parameters. For example, at the time of registration, the subscriber may specify that for a telecom device X, the invoicing rates may vary accordingly to the usage, namely, with increased data usage, a discounted pricing is applicable. While mapping the contract configuration parameter, the EMS 114 may select the applicable invoice rate depending upon usage.

The EMS 114 maps the contract configuration parameters as applicable post comparison at step 630. For example, in the scenario where the total telecom/network data (historical and current included) used by a telecom device/subscriber is more than the contractually permitted telecom/network data, the EMS 114 may map an invoice rate that corresponds to a special invoicing rate. The special invoicing rate may refer to a contractually agreed pricing of the telecom/network data which may exceed or is lower than the regular invoicing rate. Alternately, in the scenario where the total telecom/network data (historical and current included) used by a telecom device/subscriber is less than the contractually permitted telecom/network data, the EMS 114 may map an invoice rate that may be a regular invoice rate. The regular invoicing rate may refer to a contractually agreed pricing of the telecom/network data.

At step 650, the expense management system 114 generates an invoice using the parameters obtained in step 640. In an embodiment, the expense management system 114 may identify the request on the basis of an identifier for example, the TELECOM_ID and provide a corresponding invoice for actual data generated for the outstanding invoicing period (From date—To date/till date) for the telecom device 110. While generating the invoice for the real-time outstanding invoicing period for one or more telecom devices, the EMS takes into account the actual data with the invoicing rate for that telecom ID. In an embodiment, the expense management system 114 is configured to display the real-time outstanding invoicing amount for the determined invoicing period in a graphical format, a tabular format, a spread sheet format, charts, or a combination thereof as per the request received from the one or more subscribers/users/administrators through the client 104.

The expense management system 114 is configured to generate report using the generated data for the one or more subscribers as per the invoice period mentioned during registration or on request (say 15 days/every week on Monday/monthly). Alternately, the expense management system 114 may provide all the required details along with analysis for generating an invoice to a telecommunications provider who in turn may use the details to generate the invoice.

The process ends at step 660.

It may be noted that the above flowcharts are exemplary and illustrate various embodiments/scenarios where the present invention can be applied. Any other variations that can be practised along with the teachings of the present invention are considered to be within the scope of the present invention. Some of them are described below with the help of examples.

By way of example, FIG. 6 is explained using the table of FIG. 4. Telecom_ID M001789 is assigned 500 minutes of talk time (that is, telecom data) every month with the billing cycle starting on 1st of a month to the last day of the month. Telecom_ID M001789 uses a talk time of 400 minutes in March in the respective bill cycle. Thus, 100 minutes of talk time remain unused. The Telecom_ID M001789 would be invoiced for 100AUD as per the contract and remaining unexploited 100 minutes talk time is stored in the lookup table to be carried forward for the month of April. On 15th April, the expense management system 114 receives an invoice request (that is, request date) from the Telecom_ID M001789. The expense management system 114 acquires the telecom/network data on April 15 which corresponds to 600 minutes of talk time being consumed by the Telecom_ID M001789.

Thereafter, the expense management system 114 compares the current data (600 minutes of talk time) consumed with the permissible monthly contract data (500 minutes talk time) and thus, calculates the overused data (100 minutes talk time). The expense management system saves the permissible calls data (500 minutes talk time) and the overused calls data (100 minutes talk time) for the current invoicing period into a lookup table against that telecom ID.

The expense management system 114 maps the overused data (100 minutes talk time) with the historical data which provides (100 minutes talk time) being carried forward for the Telecom_ID M001789. Based on the mapping, the expense management system 114 interprets that over used calls data (namely, talk time in minutes) is neutralised with the unexploited calls data as per historical call data. Therefore, the expense management system 114 revokes the overused data (100 calls data) for current bill invoicing. Also, the expense management system 114 stores the permissible and overused calls data for the current month (April 15 days) into the look up table for that telecom ID. The expense management system 114 calculates that actual call data to be invoiced at 100 AUD as per the contract for the Telecom_ID M001789's.

In another exemplary depiction, Telecom_ID D002723 is assigned an aggregated network data plan of 100 GB data which is shared amongst 10 telecom devices with a billing cycle starting on 1st of a month to the last day of the month. As per the contract configuration parameter, each telecom device is assigned 10GB data per month. Every month, 10GB network data is added to a network data wallet of each telecom device. As per the contract, each telecom device may access more than 10GB data in the current month but aggregate of the network data consumed is limited to 100 GB. Further, when a telecom device consumes network data beyond the permissible limit as per the contract, then, the expense management system 114 is configured to borrow the network data from unconsumed network data of other telecom device in the aggregate network plan. Also, the expense management system 114 is configured to save carry/borrow network data for each telecom device for current month in the look up table.

Further, the expense management system 114 maps additional aggregate network data (if any) with the permissible aggregate network data of the current month to identify actual data aggregate for invoicing in the current month. Also, the expense management system 114 is configured to map the network data usage by every telecom device of the aggregated network data plan in the current month in addition to the historical data usage by every telecom device. Accordingly, the expense management system 114 is configured to adjust the additional consumed data of the one or more telecom devices with the unconsumed/buffer data of the one or more telecom devices in the current month.

As depicted in exemplary FIG. 4, aggregated network data usage for the Telecom_ID D002723 is 100 GB which is to be consumed by ten telecom devices (say ID1_10GB, ID2_10GB, ID3_10GB, ID4_10GB, ID5_10GB, ID6_5GB, ID7_15GB, ID8_5GB, ID9_5GB, ID10_10GB). When requested for details, the expense management system 114 acquires network data consumed by the ten telecom devices and stores the same against the unique ID in the lookup tables.

The expense management system 114 compares the acquired aggregated network data usage (90 GB) with the permissible aggregated network data (100 GB) limit of the current month as per the contract configuration parameter. Optionally, the expense management system 114 also compares the network data consumed (say ID1_10GB, ID2_10GB, ID3_10GB, ID4_10GB, ID5_10GB, ID6_5GB, ID7_15GB, ID8_5GB, ID9_5GB, ID10_10GB) by each telecom device. The expense management system 114 assesses that though the aggregated network data usage (90 GB) is within the permissible limits for the current month but the data consumed by telecom device ID7_15GB exceeds the permissible network data limit of 10GB as per the contract.

The expense management system 114 adjusts the additional used network data (5GB by ID7) from unused aggregated network data (15GB) or from historical carried forward network data. Accordingly, the expense management system 114 saves unused aggregate network data of 10GB after adjustment in the look up table for the current month for that telecom ID D002723. Also, the expense management system 114 saves individual network data of all the telecom devices in the look up table for future purposes.

The expense management system 114 calculates that actual network data to be invoiced at 200 AUD as per the contract for the Telecom_ID D002723.

From the above, it may be seen that the expense management system 114 fetches accurate bills as per negotiated contracts and solves a prolonged problem of inaccurate invoicing by telecommunications providers which may either lead to over invoicing, impacting customer satisfaction, or to under invoicing, leading to revenue leakage which can be a significant cost to the telecommunications providers.

Further, as this data is acquired in "near real-time" (e.g. hourly or daily) rather than at the end of the invoicing period, the subscriber is able to see their unbilled usage and spend for the period-to-date, and thus identify any issues before the invoice is issued. The customer may view their anticipated future invoicing for telecommunications services for the current invoicing period, rather than the customer needing to wait for the end of the monthly invoicing cycle before seeing their usage and invoicing. In addition, the expense management system facilitates access to historical usage and spends for many months or years, once the data has been loaded into the expense management system. For example, the expense management system provides a full historical view of a subscriber's usage for any or all telecommunications services provided by the telecommunications provider for a historical billing period for the used telecom/network data and for which the contract has been in force.

At certain places, the terms actual telecom/network data, acquired telecom/network data and used telecom/network data are used interchangeably. In some instances, the term permissible data is used interchangeably with contractual telecom/network data.

It will be apparent to one of ordinary skill in the art that aspects of the disclosure, as described above, may be implemented in many different forms of software, firmware, and hardware in the various implementations. The actual software code or specialized control hardware used to implement aspects consistent with the present disclosure is not limiting of the present disclosure. Thus, the operation and behaviour of the aspects were described without reference to the specific software code—it being understood that a person of ordinary skill in the art would be able to design software and control hardware to implement the aspects based on the description herein.

The foregoing description of preferred embodiments of the present disclosure provides illustration and description, but is not intended to be exhaustive or to limit the disclosure to the precise form disclosed. Modifications and variations are possible in light of the above teachings or may be acquired from practice of the disclosure.

No element, act, or instruction used in the description of the present disclosure should be construed as critical or essential to the invention unless explicitly described as such. Also, as used herein, the article "a" is intended to include one or more items. Where only one item is intended, the term "one" or similar language is used.

I claim:

1. A telecom information processing system, comprising: a processor coupled to a memory, the processor configured to communicate over a network with disparately located one or more telecom devices of a subscriber, the processor configured to execute the following computer-executable instructions stored in the memory:
   a data acquisition module configured to acquire telecom/network data used by the one or more telecom devices of a subscriber directly from one of a telephone exchange or a telecommunications equipment in real-time; and
   an intelligent module configured to compare telecom/network data acquired in real-time from one of a telephone exchange or a telecommunications equipment, with contractual parameters, including permissible usage data, as specified in one or more contracts between a telecommunications provider and the subscriber, the intelligent module configured to map one or more contract configuration parameters of the one or more contracts to the acquired telecom/network data and historical telecom/network data on the basis of the comparison to generate mapped contract configuration parameters to be used for invoicing.

2. The telecom information processing system according to claim 1, wherein the telecom/network data comprises of communication data records and/or data session records.

3. The telecom information processing system according to claim 1, wherein the contract configuration parameters correspond to invoicing rates associated with the telecom usage data, invoicing offers for a group of the one or more telecom devices, invoicing rates associated with real time location of the one or more telecom devices, invoicing rates associated with call duration, invoicing rates associated with the telecom devices operating in locations served by other telecom service providers, data packet volumes, invoicing rates for the telecom devices making full or partial usage of a shared pool of data or allocated call duration or invoicing rates for network data.

4. The telecom information processing system according to claim 1, wherein the processor is hosted on a server of the telecommunications provider.

5. The telecom information processing system according to claim 1, wherein the intelligent module is configured to analyse the acquired telecom/network data and optionally any number of historical billing periods individually or in aggregate.

6. The telecom information processing system according to claim 1, further comprising an invoicing module configured to calculate an unbilled period to date usage in real-time based on the mapped contract configuration parameters, and/or to calculate the full invoice for any given invoice cycle.

7. The telecom information processing system according to claim 6, wherein the invoicing module is configured to send the invoice to an enterprise resource planning (ERP) system or an accounting system.

8. The telecom information processing system according to claim 1, wherein the real-time request corresponds to a determined invoicing period that includes a historical invoicing period for an individual telecom device or in aggregate for the one or more telecom devices.

9. The telecom information processing system according to claim 1, wherein:
   the intelligence module is configured to provide a full historical view of the subscriber's usage for any or all telecommunications services provided by the telecommunications provider for a historical billing period for the acquired telecom/network data and for which the contract has been in force; and
   optionally, an interface module is configured to display the full historical view of the subscriber's usage of the any or all telecommunications services provided by the telecommunications provider for the historical billing period for the acquired telecom/network data and for which the contract has been in force.

10. The telecom information processing system according to claim 9, wherein the interface module is configured to display to the subscriber analysis of a current incomplete billing period and one or more historical billing periods.

11. The telecom information processing system according to claim 9, wherein the interface module is configured to display the real-time outstanding amount in a graphical format, a tabular format, a spreadsheet format, charts, or a combination thereof.

12. The telecom information processing system according to claim 1, wherein the intelligence module is configured to apply a special invoicing rate when the acquired telecom/network data along with optionally historical telecom/network data used by one telecom device exceeds specified telecom/network usage parameters in the contract.

13. The telecom information processing system according to claim 1, wherein the intelligence module is configured to apply a special invoicing rate when combined historical and the acquired telecom/network data of all the telecom devices of the subscriber exceed specified telecom/network usage parameters in the contract.

14. The telecom information processing system according to claim 1, wherein the intelligence module is configured to track the one or more contracts between the telecommunications provider and the subscriber to provide updated comparison.

15. A telecom information processing method, comprising: employing at least a processor configured to execute computer-executable instructions stored in a memory to perform the following acts:
  acquiring telecom/network data used by one or more telecom devices of a subscriber directly from one of a telephone exchange or a telecommunications equipment in real-time;
  comparing telecom/network data acquired in real-time from one of a telephone exchange or a telecommunications equipment, with contractual parameters, including permissible usage data, as specified in one or more contracts between a telecommunications provider and the subscriber; and
  mapping the one or more contract configuration parameters of the one or more contracts to the acquired telecom/network data and historical telecom/network data on the basis of the comparison to generate mapped contract configuration parameters to be used for invoicing.

16. The telecom information processing method according to claim 15, wherein the telecom/network data comprises of communication data records and data session records.

17. The telecom information processing method according to claim 15, wherein the contract configuration parameters correspond to invoicing rates associated with the telecom usage data, invoicing offers for a group of the one or more telecom devices, invoicing rates associated with real time location of the one or more telecom devices, invoicing rates associated with call duration, invoicing rates associated with the telecom devices operating in locations served by other telecom service providers, data packet volumes, invoicing rates for the telecom devices making full or partial usage of a shared pool of data or allocated call duration or invoicing rates for network data.

18. The telecom information processing method according to claim 15, further comprising analysing the acquired telecom/network data and optionally, any number of historical billing periods individually or in aggregate.

19. The telecom information processing method according to claim 15, further comprising reporting/displaying to the one or more telecom devices accurately the real-time outstanding amount for a determined invoicing period.

20. The telecom information processing method according to claim 15, wherein the determined invoicing period includes a historical invoicing period for an individual telecom device or in aggregate for the one or more telecom devices.

21. The telecom information processing method according to claim 15, further comprising providing a full historical view of the subscriber's usage for any or all telecommunications services provided by the telecommunications provider for a historical billing period for the acquired telecom/network data and for which the contract has been in force.

22. The telecom information processing method according to claim 15, further comprising:
  providing a full historical view of the subscriber's usage for any or all telecommunications services provided by the telecommunications provider for a historical billing period for the acquired telecom/network data and for which the contract has been in force; and
  optionally, displaying the full historical view of the subscriber's usage of the any or all telecommunications services provided by the telecommunications provider for the historical billing period for the acquired telecom/network data and for which the contract has been in force.

23. The telecom information processing method according to claim 15, further comprising displaying the real-time outstanding amount in a graphical format, a tabular format, a spreadsheet format, charts, or a combination thereof.

24. The telecom information processing method according to claim 15, further comprising sending the invoice to an enterprise resource planning (ERP) system or an accounting system.

25. The telecom information processing method according to claim 15, further comprising calculating an unbilled period to date usage in real-time based on the mapped contract configuration parameters, and/or calculating the full invoice for any invoice cycle.

26. The telecom information processing method according to claim 15, further comprising applying a special invoicing rate when the acquired telecom/network data along with optionally historical telecom/network data used by one telecom device exceeds specified telecom/network usage parameters in the contract.

27. The telecom information processing method according to claim 15, further comprising applying a special invoicing rate when combined historical and the acquired telecom/network data of all the telecom devices of the subscriber exceed specified telecom/network usage parameters in the contract.

28. The telecom information processing method according to claim 15, further comprising tracking the one or more contracts between the telecommunications provider and the subscriber to provide updated comparison.

* * * * *